United States Patent Office 3,561,248
Patented Feb. 9, 1971

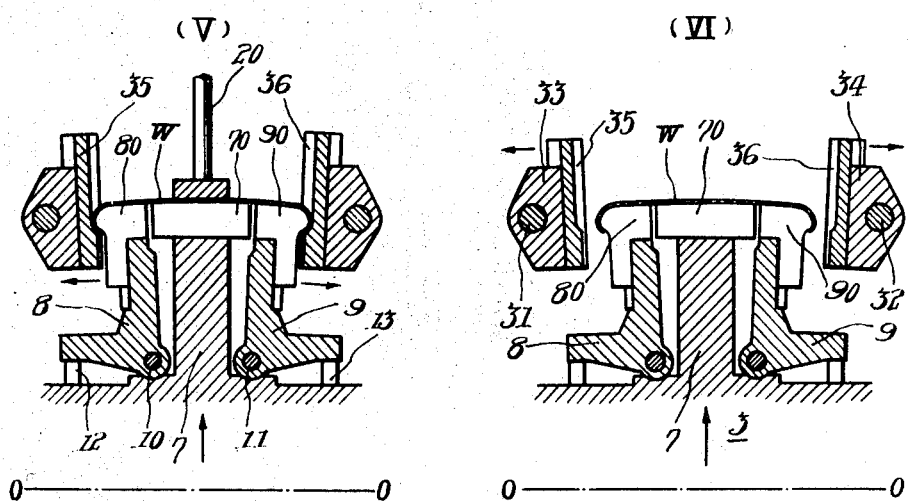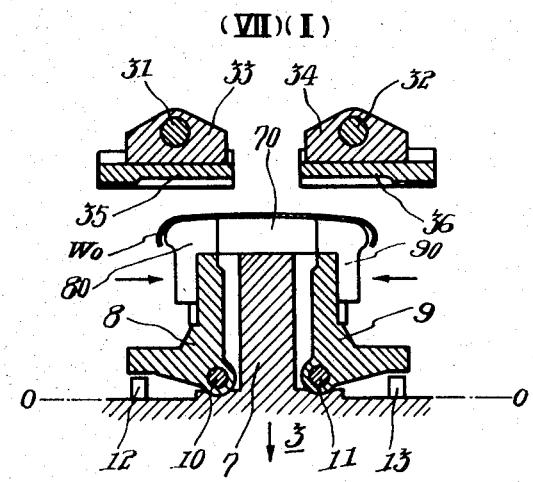

3,561,248
APPARATUS FOR FORMING CURVED METAL
BARS AS AUTOMOBILE BUMPERS
Michio Bessho, Himeji-shi, Japan, assignor to Kawasaki
Yuko Kabushiki Kaisha, Takasago-shi, Japan
Filed May 21, 1968, Ser. No. 730,778
Int. Cl. B21d 7/04, 7/025, 7/028
U.S. Cl. 72—383                                           4 Claims

ABSTRACT OF THE DISCLOSURE

Forming apparatus employing a pair of rockable female die members and a split type male die assembly including a pair of side die members. The female die members serve to roll-bend the opposite end portions of the blank in cooperation with the side members of the male die as as latter is forced to rise. Subsequently, upon expansion of the male die assembly, the intermediate portion of the blank with its end portions clamped against the side male die members is efficiently stretch-formed along the contoured surface of the male die assembly through plastic deformation of the material.

---

This invention relates to improvements in apparatus for forming curved metal bars such as automobile bumpers.

Bumper forming apparatus of the type which includes a metal mold or die adapted to rotate about an axis of rotation and roller means operable under the action of a pressure device to press a blank against the metal mold has been previously known (for example, see Japanese patent publication No. 40/18,157). The present invention provides an improved apparatus for forming automobile bumpers or the like curved metal bars which employs in place of the pressure roller used in the known type of bumper forming apparatus a pair of rockable female die members movable in response to the linear movement of a reciprocable male die to roll over the curved surfaces formed on the end portions of the male die progressively along the blank positioned thereon thereby to form both of the curved end portions of the bumper or the like at a time. The male die is of the split type made in three separate die members including an intermediate or central member and a pair of longitudinally spaced side members movable apart therefrom to stretch-form the intermediate portion of the blank into the desired configuration of limited curvature through plastic deformation of the blank material.

The present invention has for its object to provide a forming machine particularly adapted for the forming, for example, of automobile bumpers having a relatively complicated configuration contour along the length thereof.

Another object of the invention is to provide a forming machine of the character described which is, as compared with conventional bumper forming machines, high in forming accuracy, easy to operate, high in working speed, limited in loss of material and thus suitable for quantity production.

A further object of the invention is to provide a forming machine of the character described which employs forming dies that are easy to fabricate and inexpensive.

These and other objects, features and advantages of the invention will become apparent from the following description when taken in conjunction with the accompanying drawings, which illustrate one preferred embodiment of the invention and in which.

Figure 6:
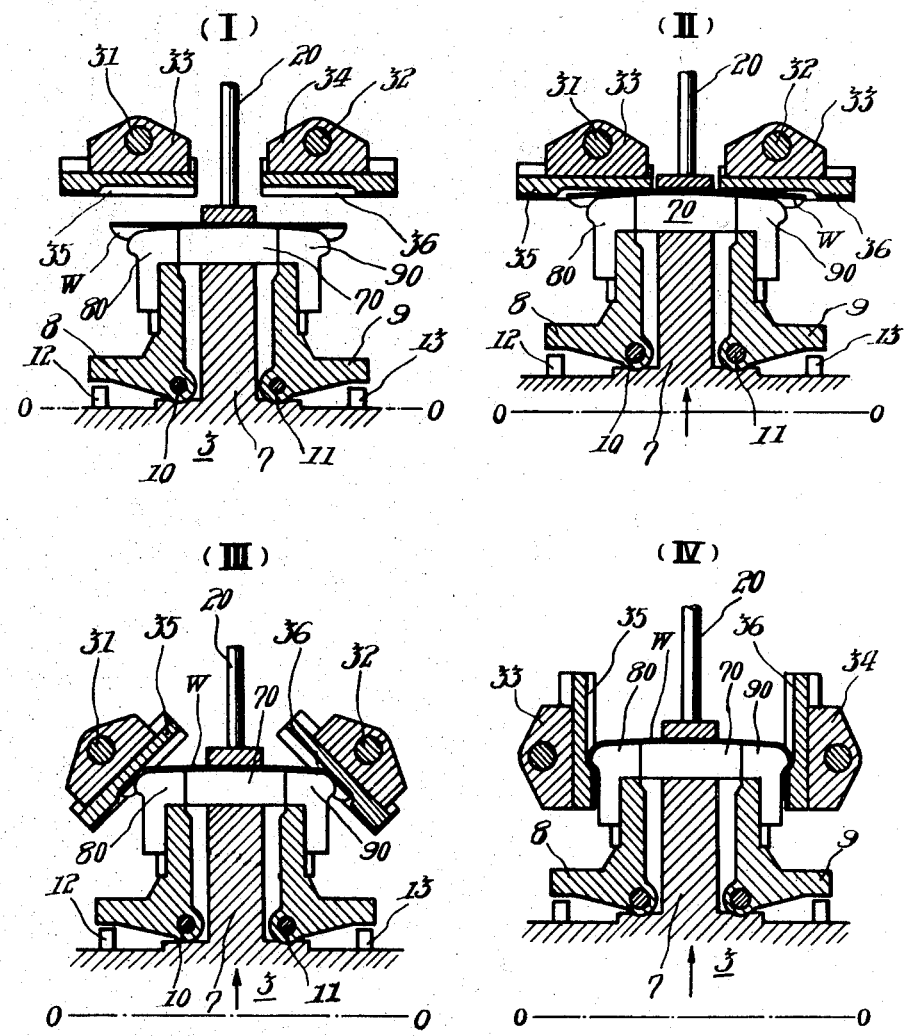

FIGS. 6(I), 6(II), 6(III), 6(IV), 6(V), 6(VI) and 6(VII) are fragmentary vertical cross-sectional views illustrating the successive stages of operation of the present machine and the blank being worked.

Referring to the drawings, the bumper forming machine illustrated includes a machine frame 1 having four vertically extending parallel guide members 6 secured on the inside 2 of the frame and a male die supporting table or platen 3 arranged for vertical sliding movement along said guide members 6. Secured to the bottom of the supporting table 3 is a piston 5 which is received in a hydraulic cylinder 4 provided in the bottom of the frame 1 and is actuatable under hydraulic pressure being supplied to the cylinder. Mounted on the supporting table 3 is a male die assembly of the split type including a plurality of separable mold members arranged longitudinally of the bumper blank W as loaded on the machine. The supporting table 3 carries on its top male die mounting means which includes a central fixed mount 7 and a pair of rockable mounts 8 and 9 pivotally secured to the central fixed mount 7 on the opposite sides thereof by means of pins 10 and 11, respectively, and rockable to open and close relative to the central fixed mount 7. Male die members 70, 80 and 90, made of hard steel, are removably secured by appropriate means to the fixed and rockable mounts 7, 8 and 9, respectively. Formed within a part of the fixed mount 7 is a space in which is accommodated a hydraulic piston and cylinder assembly including a cylinder body 14 and a piston 18 slidably received therein. The cylinder body 14 is formed at its closed end with a projection carrying a pivot pin 15, by means of which the cylinder 14 is pivotally secured to one of the rockable mounts 9. The piston 18 received in cylinder 14 is formed integral with a rod 16, which extends exteriorly through the other end of the cylinder and at the extreme end is pivoted to the other rockable mount 8 by means of a pivot pin 17. With this arrangement, the piston and cylinder assembly can operate under a supply of hydraulic pressure thereto to rock the rockable mounts 8 and 9 between their closed and open positions relative to the central fixed mount 7. Provided on the top of the supporting table 3 are stop means 12 and 13 to define the range of rocking movement of the rockable mounts 8 and 9, respectively.

Two pairs of female die hanging levers 39 and 40 are suspended from the top of the machine frame 1 by means of respective pivotal pins 37 and 38 to extend into the top portion of the space defined within the machine frame 1. The hanging levers 39 and 40 are pivotally connected at their respective free or bottom ends with female die support blocks 33 and 34, respectively, by means of pivot pins 31 and 32. Mounted on the bottom of these support blocks 33 and 34 are a pair of right and left female die members 35 and 36 shaped symmetrical to each other. These die members 35 and 36 are removably secured to the underside of the respective female die support blocks 33 and 34 and are adjustable in position thereon. Pivoted to the free ends of the respective hanging levers 39 and 40 by means of pivot pins 31 and 32 are connecting rods 29 and 30, which are pivotally connected at the other end with respective piston rods 25 and 26 by means of pivot pins 27 and 28, as shown. Piston rods 25 and 26 are formed integral with respective pistons received in hydraulic cylinders 23 and 24, which are symmetrically arranged on the opposite sides of the machine frame. With this arrangement, both female die members 35 and 36 and support blocks 33 and 34 therefor are rockable to the left and right, respectively, about the fulcrum points 37 and 38 of the hanging levers 39 and 40 by introducing hydraulic pressure into the respective hydraulic cylinders 23 and 24. Also, mounted on the top of the machine frame 1 is a hydraulic piston and cylinder assembly which includes a vertically arranged cylinder body 19 and a piston received therein and formed integral with a rod 20, which extends vertically downward from the piston and has an enlarged bottom end 21 for engagement with the blank W as positioned on the male mold assembly 70, 80 and 90. The enlargement 21 serves to press and hold the intermediate region of the blank W against the male die and particularly the central fixed member 70 thereof upon energization of the piston and cylinder assembly 19–20.

The forming machine described above operates as follows.

At the start, a number of provisions are made according to the configuration of the product bumper and particularly of its opposite wing portions and to the entire length of the bumper. Firstly, male die members 80 and 90 are selected according to the length and curved configuration of bumpers to be formed and secured to the respective rockable mounts 8 and 9 on the supporting table 3. Then, female die members 35 and 36 are selected and secured to the respective female die supports 33 and 34 for cooperation with the respective male die members 80 and 90. It will be readily understood that the configuration of the opposite wing portions of the bumper formable by the forming machine is determined by the selection of the male die members 80 and 90 and the female mold members 35 and 36 cooperable therewith.

Figure 1:
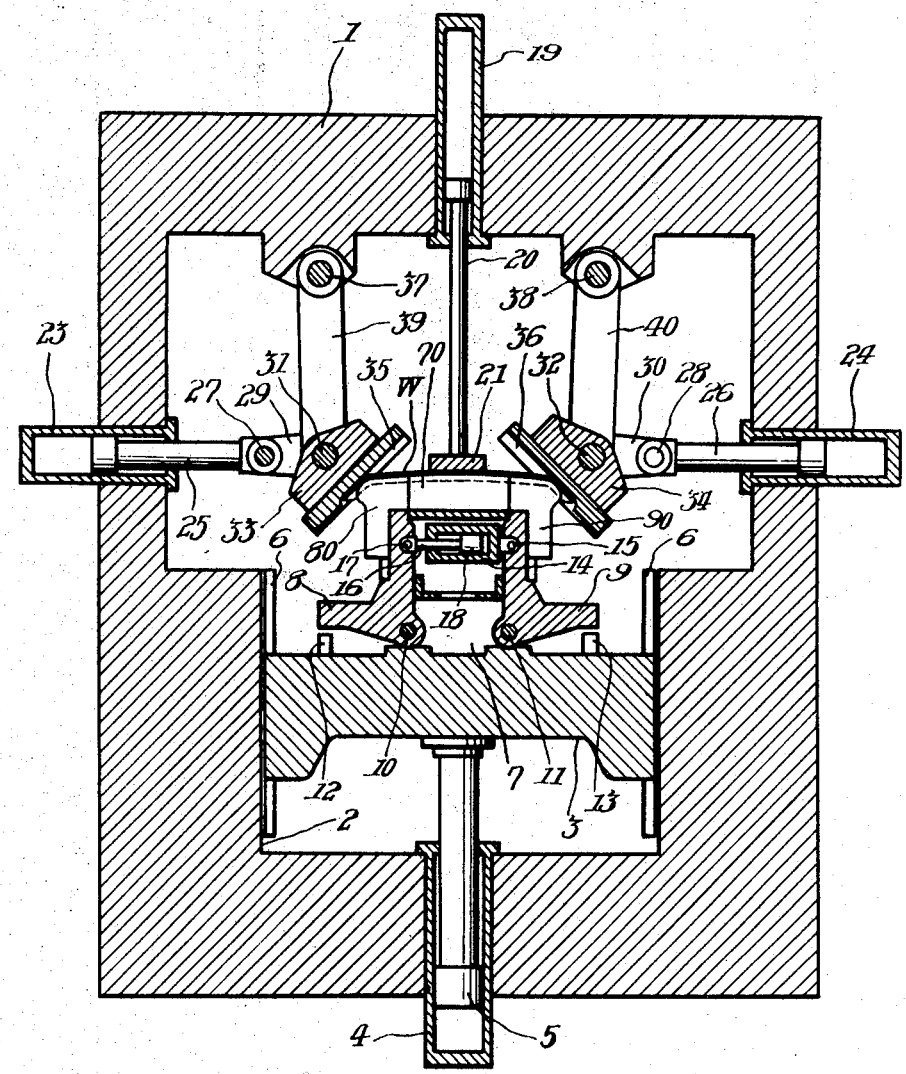
FIG. 1 is a vertical cross-sectional view of the bumper forming machine embodying the principles of the invention, taken through the essential part of the machine and showing the machine in the stage of forming the opposite curved end portions of the bumper.

In loading the machine with a blank W to be worked, the cylinder and piston assembly 4–5 is first, energized to lower the male die supporting table 3. On this occasion, it is to be understood that the piston 18 in the hydraulic cylinder 14 is at the right-hand end of its stroke as viewed in FIG. 1 under the hydraulic pressure fed to the cylinder space on the left-hand side of the piston and thus the male die is in its closed position with the rockable male die members 80 and 90 held in close contact with the respective end surfaces of the central fixed male die member 70. Blank W is positioned on top of such closed male mold assembly 70, 80 and 90 and thereafter the piston and cylinder assembly at the top of the machine is energized by introducing hydraulic pressure into the cylinder 19 to move piston rod 20 downwardly until the blank W is frmly clamped against the top surface of the male die member 70 by the enlarged bottom end 21 of the piston rod, as shown in FIG. 6(I). The dotted line O—O indicates the horizontal plane in which lies the top surface of the supporting table 3 as positioned for such loading of blank W.

Subsequent to the above preliminary or loading operation, hydraulic pressure is introduced into the cylinders 23 and 24 horizontally mounted on the opposite sides of the machine frame so that the piston rods 25 and 26 associated with the respective cylinders 23 and 24 are actuated toward each other to swing the hanging levers 39 and 40 about the respective fulcrum points 37 and 38 through the medium of respective connecting rods 29 and 30 toward the center of the machine frame 1. Simultaneously with this, it will readily be recognized that the male die support blocks 33 and 34, being pivoted to the respective hanging levers and connecting rods, are moved toward each other into their extreme inner end position end position in which the female die members 35 and 36 carried by the respective support blocks lie horizontally over the closed male die assembly, as shown in FIG. 6(II). Then, the bottom hydraulic cylinder and piston assembly 4–5 is activated to cause the male die supporting table 3 to rise until the male die assembly 70, 80 and 90 engages the horizontally positioned female die members 35 and 36 to press the blank W against the latter, conforming the blank to the cross-sectional configuration of the female die members, and thus preparation for forming operation is completed.

Incidentally, the hydraulic cylinders 19, 23 and 24 are each provided with a pressure regulator valve, not shown, to enable the respective pistons to operate under suitable pressure even when the hydraulic pressure within the cylinders varies under some or other external influence so that the female die members 35 and 36 are placed in contact with the male die assembly under appropriate pressure.

Figure 2:
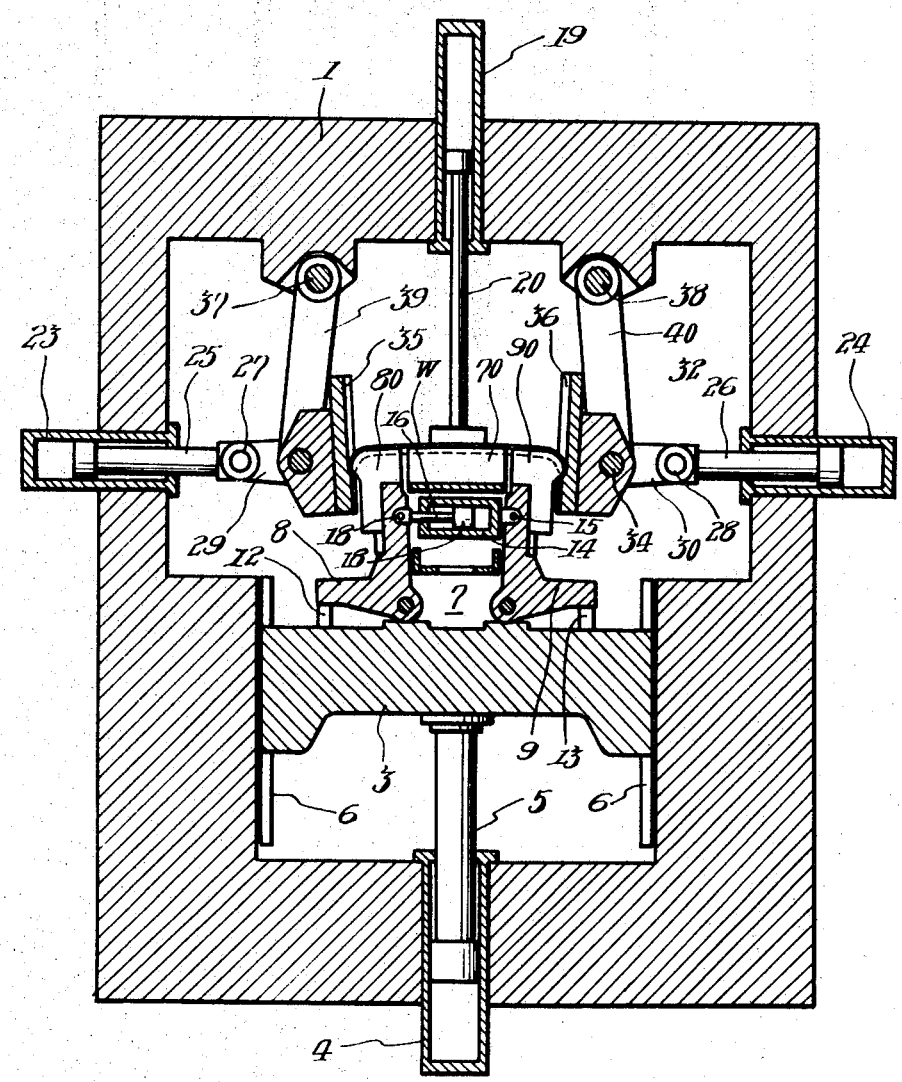
FIG. 2 is a view similar to FIG. 1, showing the machine in the state it assumes at the end of the stage of forming the bumper end portions shown in FIG. 1.
Figure 3:
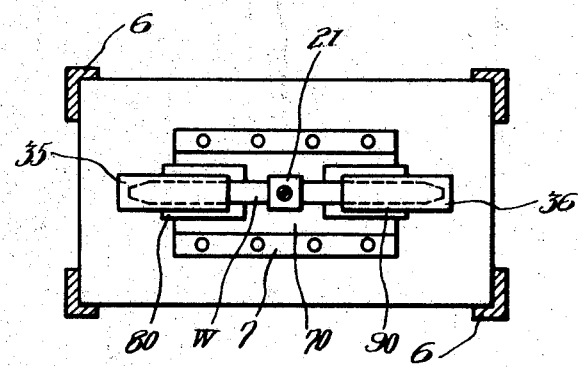
FIG. 3 is a detached plan view, partly in section, showing the relative position of the male die, male die supporting table or platen and female die members of the machine.
Figure 4:
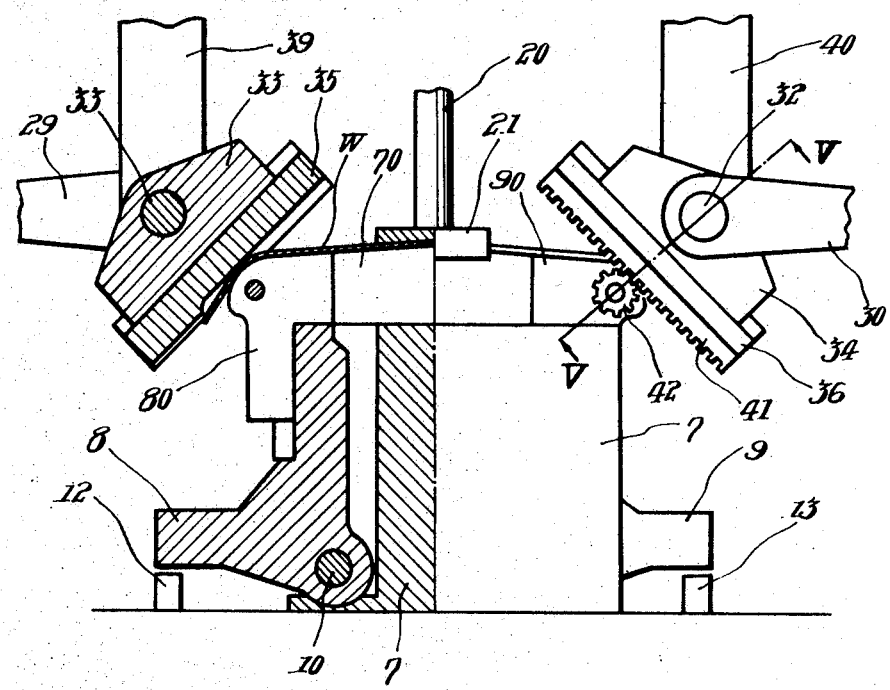
FIG. 4 is an enlarged fragmentary side elevation of the mechanism for causing the female die members to roll over the male die without any sliding movement relative thereto, the left-hand half of the mechanism being shown in cross section.
Figure 5:
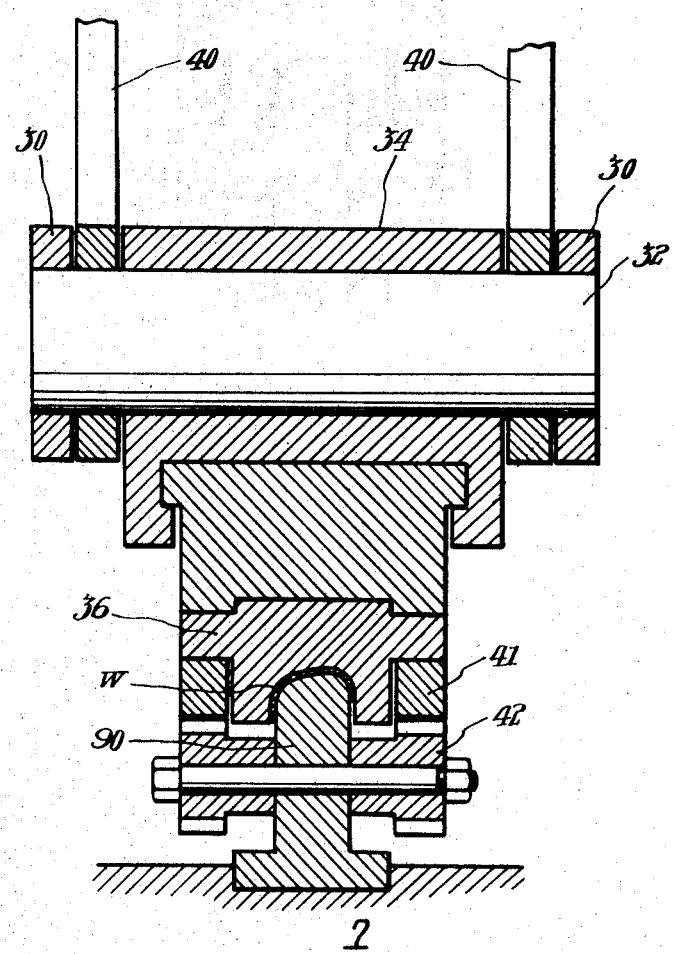
FIG. 5 is a cross-sectional view taken along the line V—V in FIG. 4.

Starting next with the state of parts shown in FIG. 6(II), the hydraulic cylinder 4 for actuating the male die supporting table 3 is fed with a hydraulic pressure overriding the hydraulic pressure within the top cylinder 19 and side cylinders 23 and 24 to actuate the piston 5 so as to raise the male die mounts 7, 8 and 9 together with the respective male die members 70, 80 and 90. As the result, piston rods 25 and 26 are retracted through the medium of the respective female die members 35 and 36 while at the same time the hanging levers 39 and 40 are swung outwardly about their respective fulcrum points 37 and 38. On this occasion, it will be readily appreciated that the female die support blocks 33 and 34 are forced upwardly by the respective male die members 80 and 90 so as to move away from each other while rocking about the respective axes of pivot pins 31 and 32 in such a manner that the female die members 35 and 36 secured to the respective support blocks 33 and 34 are displaced outwardly progressively along the adjacent curved end portions of the respective male die members 80 and 90 in a rolling fashion, maintaining a pressure contact therewith to roll-bend the blank W. In order to secure the rolling contact of the female die members 35 and 36 with the curved end portions of the male die members 80 and 90 without any sliding movement relative thereto, rack and pinion means are provided in the embodiment, as shown in FIGS. 4 and 5, which include toothed racks 41 formed on the opposite edges of each of the female die members 35 and 36 longitudinally thereof and a pinion 42 fixedly mounted on each of the male die members 80 and 90 on an axis corresponding to the center of curvature of the curved end portion of the associated male die member 80 or 90 and thus held in mesh with the adjacent toothed racks 41 on the associated female die member 35 or 36. With this arrangement, the female die members 35 and 36 are securely constrained around the respective fixed pinions 42 to roll over the curved end portions of the respective male die members 80 and 90 without any sliding movement relative thereto. Upon continued rising movement of the male die supporting table 3, the piston rods 24 and 25 are further forced to retract, allowing the female die members 35 and 36 to assume respective vertical positions as shown in FIG. 6(IV) and also in FIG. 2, thus completing the roll-bending of the opposite wing portions of the blank W.

Up to this time, it is to be noted, however, that the forming operation upon the entire blank W is not completed. In other words, the central portion of the blank W, i.e., that portion of the blank which lies intermediate its wing portions and has a limited curvature is being subjected at this time to only a limited bending stress within the range of elastic deformation below the yielding point of the bumper material under the combined action of the female die members 35 and 36 and the male die members 80 and 90. It will be evident that, if the blank W is released from the bending force of the female die members 35 and 36, the slightly curved intermediate portion of the blank will instantly restore its initial configuration under the resilience of its own.

To cope with this situation, the blank W is stretch-formed in conformity with the configuration of the male die assembly 70, 80 and 90, causing plastic deformation to the slightly curved intermediate portion of the blank, as described below. Thus, with the opposite wing portions of the blank W clamped against the male die members 80 and 90 by the respective female die members 35 and 36 (see FIG. 6(IV)), hydraulic pressure is introduced into the right-hand side space in the cylinder 14, as viewed in FIG. 1, to rock the rockable male die mounts 8 and 9 outwardly about the axes of the respective pivot pins 10 and 11 thereby to expand the distance between the side members 80 and 90 of the male die, as shown in FIG. 6(V). Under this expanding action, the blank W will be subjected to a large pulling force acting longitudinally thereof particularly along the slightly curved top surfaces of the male die members 80 and 90. In this connection, the range of expanding movement of the rockable male die mounts 8 and 9 can be properly selected by adjustment of the stops 12 and 13, provided on the male die supporting table 3, in accordance with the material, length, thickness and width of the blank. By such stretch-forming, it is to be understood that an elongation is imparted to the blank W which so much exceeds the elastic limit of the blank material that the blank, undergoing plastic deformation, is efficiently formed into the curved configuration of the top surface of the male die members 70, 80 and 90 and simultaneously with this any slack formed along the side edges of the slightly curved intermediate portion of the blank is removed.

In this manner, the slightly curved portion of the blank is completely formed into the desired configuration to obtain a completed bumper product. Subsequently, the hydraulic pressure being fed into each of the side cylinders 23 and 24 is switched to actuate the respective piston rods 25 and 26 in the opposite direction to retract the female die members 35 and 36 (see FIG. 6(VI)) and the direction in which bottom piston and cylinder assembly 4–5 acts is reversed to cause the male die mounts 7, 8 and 9 to descend. Simultaneously with this, the supply of hydraulic pressure to the cylinder 14 is switched to retract the piston rod 16 thereby to close the rockable mounts 8 and 9 so that the male die members 80 and 90 are placed back into close contact with the central fixed male die member 70 to release the formed product $W_0$. With the machine thus restored to its initial state shown in FIG. 1, the product can be removed from the male die assembly and a new bumper blank placed thereon ready for resuming the cycle of forming operation described above.

As will be apparent from the foregoing description, the present invention employs a pair of female die members for cooperation with a split type male die in place of roller means conventionally used in bumper forming machines for pressure engagement with the ordinary male mold mounted therein. In operation, the female die members, forming a curved surface conforming to the configuration desired of the bumper product, are caused to roll over the contoured surface of the split type male die with the rising movement thereof to form the opposite end portions of the blank into the desired configuration with efficiency and precision. The split male die includes a pair of expansible side members serving the purpose of stretch-forming the intermediate slightly curved portion of the bumper through plastic deformation of its material. It will be readily appreciated that, according to the present invention, not only bumpers having a uniform cross section along the entire length including their extreme ends but also those having a cross section varying along the length can be advantageously formed into the desired configuration with efficiency and precision.

Although a preferred embodiment of the present invention has been shown and described, it will be apparent to those skilled in the art that various changes and modifications may be made therein without departing from the spirit of the invention or from the scope of the appended claims.

I claim:

1. An apparatus for forming curved metal bars such as automobile bumpers, comprising a frame, a male mold supporting table mounted on said frame for reciprocating movement, a male die assembly mounted on said supporting table and having convex surfaces contoured to conform with the winged end portion configuration desired of the product, two rockable levers pivotally hung from the top of the frame, and a pair of movable female die members pivotally connected with said respective rockable levers and having concave surfaces for engagement with the convex surfaces of the male die assembly through the medium of a blank as positioned thereon, said female die members being operable in association with the working movement of said male mold assembly to roll over the convex surfaces thereof thereby to bend the blank into the desired curved configuration, said male die assembly including a pair of longitudinally spaced movable male die members adapted to move toward and away from each other and a fixed central male die member arranged intermediate said movable male die members to form a continuous forming surface together therewith, and means for separating said movable male die members by longitudinal movement thereof while maintaining a substantially continuous forming surface with said central male die member, the arrangement being such that, after the opposite end portions of the blank have been formed into the desired curved configuration by cooperation of said female die members with the male die assembly closely held together, the blank can be longitudinally stretch formed through plastic deformation of the material as the movable male die members are moved apart from the central male die member.

2. An apparatus as defined in claim 1, further comprising a first hydraulic assembly operable to reciprocate said supporting table with the male die assembly mounted thereon, second and third hydraulic assemblies for actuating said female die members toward each other, said first hydraulic assembly being operable to advance said male die assembly overriding said second and third hydraulic assemblies thereby to cause said female die members to retract while keeping rolling engagement with the convex surface of the male die assembly through the medium of the blank positioned thereon.

3. An apparatus as defined in claim 1 further comprising a hydraulic assembly including a cylinder and a piston, which cylinder is carried by said frame and which piston is adapted to cooperate with said central male die to secure at least a portion of a work piece therebetween.

4. An apparatus as defined in claim 1 further comprising a hydraulic assembly including a cylinder and a piston connected with the respective movable male die members, said hydraulic assembly being thus operable to move said male die members between their closed positions in close contact with said central male die member and their open position apart therefrom, when desired, said movable male die members having operative forming surfaces remaining adjacent said forming surface of said central male die member at all times.

References Cited

UNITED STATES PATENTS

| | | | |
|---|---|---|---|
| 1,552,416 | 9/1925 | Bingham | 72—383 |
| 2,066,186 | 12/1936 | Mitchell | 72—400 |
| 2,476,596 | 7/1949 | Green | 72—403 |
| 2,932,337 | 4/1960 | Benedict et al. | 72—383 |
| 3,355,266 | 11/1967 | O'Brien | 29—190 |

LOWELL A. LARSON, Primary Examiner

U.S. Cl. X.R.

72—384, 403